G. A. Keene,
Tread for Carriage Step,
No. 65,754.   Patented June 11, 1867.

Witnesses
Thos. Wm Graine
Chas. J. Bateman.

Inventor.
Geo A Keene.

United States Patent Office.

GEORGE AUGUSTUS KEENE, OF NEWBURYPORT, MASSACHUSETTS.

*Letters Patent No. 65,754, dated June 11, 1867.*

IMPROVEMENT IN INDIA-RUBBER TREAD FOR CARRIAGE STEP.

*The Schedule referred to in these Letters Patent and making part of the same.*

TO ALL WHOM IT MAY CONCERN:

Be it known that I, GEORGE AUGUSTUS KEENE, of Newburyport, in the county of Essex, and State of Massachusetts, have invented a new and useful improved Tread for Carriage Steps; and I do hereby declare that the following is a full, clear, and exact description of the construction and operation of the same, reference being had to the accompanying drawing forming a part of this specification, sufficient to enable others skilled in the art to construct my improvement without other invention or experiment.

To avoid and obviate the common difficulty and danger of entering and leaving carriages in rainy, snowy, or dirty weather, I have invented a tread for carriage steps which forms the subject of this application.

Figure 1:
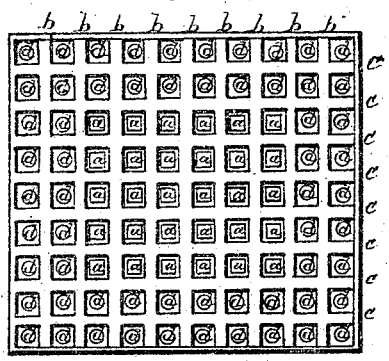
Figure 2:
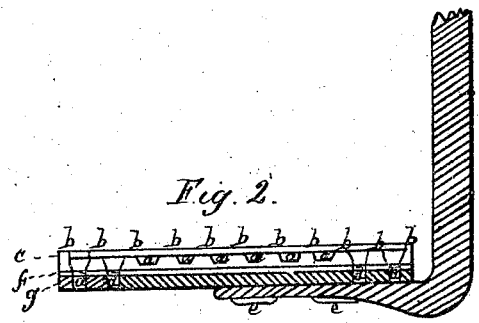

My invention, then, consists in the application to the tread of a carriage step by appropriate and permanent means of rubber formed into cells by reticulated ridges. Various ways may be conceived in which this may be done. The sheet of prepared rubber may be cemented directly to the ordinary step, or it may be fastened to a suitable arrangement of straps, and strapped to the ordinary step, or it may be affixed in the following manner, which I conceive to be, by far the best: I attach to a plate of iron or other metal, shaped as may be desired, either round, square, or oval, or of any convenient form, a quantity of rubber stock, and compress the rubber into a mould of such form as to give an intaglio of separate cells to the rubber, and vulcanize the whole; this will give a plate of the plan shown Figure 1, and the section shown Figure 2. The cells may be perforated at the bottom, and the plate beneath perforated to allow of the escape of dust.

In the figures, $a$ are the cells of the rubber tread, $b$ and $c$ are the reticulated ridges forming the cells, $d$ are the cells with perforated bottoms to allow the escape of dirt, $f$ is the plate on which the tread is vulcanized, $g$ is the ordinary step of the carriage, and $e$ are the rivets fastening the tread to the step, which I consider the best form of attachment.

I claim as my invention, and desire to secure by Letters Patent—

The arrangement and combination of the plate $f$, in connection with and securely fastened to the rubber tread, consisting of reticulated ridges $b$ and $c$, and intaglio cells $a$ and $d$ to form a tread for a carriage step, substantially as described.

GEO. A. KEENE.

Witnesses:
THOS. WM. CLARKE;
CHAS. J. BATEMAN.